US006186886B1

(12) United States Patent
Farrington et al.

(10) Patent No.: US 6,186,886 B1
(45) Date of Patent: Feb. 13, 2001

(54) VEHICLE CABIN COOLING SYSTEM FOR CAPTURING AND EXHAUSTING HEATED BOUNDARY LAYER AIR FROM INNER SURFACES OF SOLAR HEATED WINDOWS

(75) Inventors: Robert B. Farrington, Golden; Ren Anderson, Broomfield, both of CO (US)

(73) Assignee: Midwest Research Institute, Kansas City, MO (US)

(*) Notice: Under 35 U.S.C. 154(b), the term of this patent shall be extended for 0 days.

(21) Appl. No.: 09/292,078

(22) Filed: Apr. 14, 1999

(51) Int. Cl.$^7$ ................................................. B60H 1/00
(52) U.S. Cl. ........................... 454/141; 454/75; 454/124; 454/164
(58) Field of Search ...................... 454/75, 122, 124, 454/141, 162, 164, 165, 198

(56) References Cited

U.S. PATENT DOCUMENTS

| Re. 29,663 | | 6/1978 | Theissen | 428/336 |
|---|---|---|---|---|
| 809,228 | * | 1/1906 | Stephens | 454/198 |
| 1,757,080 | * | 5/1930 | Ferrara | 454/162 X |
| 2,837,018 | * | 6/1958 | Haltenberger | 454/124 |
| 3,146,019 | * | 8/1964 | Peyches | 454/122 X |
| 3,715,966 | * | 2/1973 | Miettinen | 454/124 |
| 3,949,134 | | 4/1976 | Willdorf | 428/215 |
| 4,081,300 | | 3/1978 | Willdorf | 156/71 |
| 4,261,649 | | 4/1981 | Richard | 350/276 R |
| 4,368,945 | | 1/1983 | Fujimori et al. | 350/1.7 |
| 4,465,736 | | 8/1984 | Nishihara et al. | 428/332 |
| 4,639,069 | | 1/1987 | Yatabe et al. | 350/1.7 |
| 4,788,904 | * | 12/1988 | Radtke | 454/164 |
| 4,790,591 | | 12/1988 | Miller | 160/370.2 |
| 4,813,198 | | 3/1989 | Johnston et al. | 52/171 |
| 4,943,484 | | 7/1990 | Goodman | 428/441 |
| 4,973,511 | | 11/1990 | Farmer et al. | 428/216 |
| 5,059,254 | | 10/1991 | Yaba et al. | 136/251 |
| 5,149,351 | | 9/1992 | Yaba et al. | 565/60.2 |
| 5,336,565 | | 8/1994 | Muromachi et al. | 428/432 |
| 5,408,353 | | 4/1995 | Nichols et al. | 359/275 |
| 5,468,185 | * | 11/1995 | Truitt | 454/198 |
| 5,593,929 | | 1/1997 | Krumwiede et al. | 501/70 |
| 5,595,825 | | 1/1997 | Guiselin | 428/428 |

FOREIGN PATENT DOCUMENTS 59-114108 * 7/1984 (JP) ..................... 454/141

* cited by examiner

Primary Examiner—Harold Joyce
(74) Attorney, Agent, or Firm—Ken Richardson; Paul J. White

(57) ABSTRACT

The cabin cooling system includes a cooling duct positioned proximate and above upper edges of one or more windows of a vehicle to exhaust hot air as the air is heated by inner surfaces of the windows and forms thin boundary layers of heated air adjacent the heated windows. The cabin cooling system includes at least one fan to draw the hot air into the cooling duct at a flow rate that captures the hot air in the boundary layer without capturing a significant portion of the cooler cabin interior air and to discharge the hot air at a point outside the vehicle cabin, such as the vehicle trunk. In a preferred embodiment, the cooling duct has a cross-sectional area that gradually increases from a distal point to a proximal point to the fan inlet to develop a substantially uniform pressure drop along the length of the cooling duct. Correspondingly, this cross-sectional configuration develops a uniform suction pressure and uniform flow rate at the upper edge of the window to capture the hot air in the boundary layer adjacent each window.

34 Claims, 4 Drawing Sheets

VEHICLE CABIN COOLING SYSTEM FOR CAPTURING AND EXHAUSTING HEATED BOUNDARY LAYER AIR FROM INNER SURFACES OF SOLAR HEATED WINDOWS

CONTRACTUAL ORIGIN OF THE INVENTION

The United States Government has rights in this invention under Contract No. DE-AC36-98GO-10337 between the United States Department of Energy and the National Renewable Energy Laboratory, a Division of the Midwest Research Institute.

BACKGROUND OF THE INVENTION

1. Field of the Invention

The present invention relates generally to a cooling system for a passenger compartment or cabin of a vehicle and more particularly to a cabin cooling system that captures and exhausts boundary layers of hot air that form on interior surfaces of vehicle windows that absorb energy and become hot from incident solar radiation.

2. Description of Related Art

An ongoing concern for the transportation industry is heat build-up within passenger compartments, i.e., cabins, of vehicles parked in the sun for long periods of time. The term "vehicles" includes, but is not limited to, automobiles (i.e., passenger vehicles), light duty vehicles such as sport utility vehicles (SUVs), trucks, and minivans, and miscellaneous other vehicles such as buses, larger trucks, tractors, trains, airplanes, and the like. Heat build-up leads to interior air temperatures up to 160° F. and surface temperatures up to 250° F. (i.e., "soak temperatures") as windows provide a greenhouse-type effect in enclosed vehicles. These higher temperatures cause passenger discomfort and damage heat sensitive equipment and materials, and also, result in higher peak cooling loads that must be met by vehicle air conditioning systems. Heat build-up problems are expected to continue, and even be heightened, in future vehicle models as styling themes increasingly use windows to create more stylish and aerodynamic vehicles.

Greenhouse-type heating inside a glass-enclosed space occurs primarily as a result of the glass being substantially transparent to shorter wavelength, higher energy solar radiation, including visible and ultraviolet light, but substantially opaque (not transmissive) to longer wavelength, lower energy infrared radiation. Essentially, the higher energy visible and ultraviolet radiation from the sun pass through the glass windows and is then absorbed by materials inside the glassed enclosure, such as seats, upholstering, and other objects in the passenger cabin of vehicles, where the energy in the radiation is converted to heat energy. Such heat energy raises the temperature of the objects that absorb the radiation and transfers by conduction to the adjacent air, which is trapped inside the passenger cabin of the vehicle. Meanwhile, the longer wavelength, low energy infrared radiation from the sun that is transmitted by the window into the interior of passenger cabin is, for the most part, absorbed by the glass windows, which heats the glass window. Some infrared heat energy that is re-radiated from the heated seats, upholstery, and other objects in the passenger cabin may also be absorbed by the glass windows to add heat to the glass windows. Such heat energy in the glass windows is then transferred by conduction to air that is adjacent the glass surfaces, both inside and outside of the passenger cabin. Such heated air inside the passenger cabin is trapped, so heat in the passenger cabin builds up and, of course, raises the temperature inside the passenger cabin.

In the past, the transportation industry addressed heat build-up inside passenger cabins with windows that could be opened to release hot air from the interior into the atmosphere. Later, security problems as well as desire for more and faster cooling was addressed by equipping vehicles with air conditioning systems that operated on refrigeration cycle technologies that consumed large amounts of power, thus energy, to expel heat from the passenger cabins into the atmosphere and thereby cool the interiors of vehicles. Such refrigeration cycle air conditioning systems in conventional, i.e., fossil-fueled, light-duty and passenger vehicles were feasible because energy was relatively inexpensive and the power to operate these systems at peak load was only a small portion of the engine power available in the vehicles. However, because of higher energy costs, fossil fuels depletion, pollution abatement, and government regulations, vehicle manufacturers are now producing more fuel-efficient conventional vehicles with lower-powered engines for which peak conventional air conditioning loads can require as much power as the average power required for operating such vehicles. Even higher fuel efficiency vehicles as well as electric vehicles (EVs) and hybrid electric and fossil fueled vehicles (HVs) will likely be designed with even lower operating power requirements, making auxiliary loads, of which air conditioning is the largest, a much larger percentage of total energy consumption. Therefore, to meet lower energy requirements, it is desirable to reduce air conditioning loads (energy required to expel heat) in vehicles in order to reduce power consumption, size, and weight of air conditioning units needed to cool such vehicles and, in the case of EVs, to increase driving range within practical-sized on-board battery capacities. Decreasing air conditioning loads will also make it easier for vehicles to comply with the new emission regulations, such as the Supplemental Federal Test Procedure (SFTP) scheduled to be in effect by 2004 in the United States, which will require tailpipe emissions testing with air conditioning systems set at maximum operating levels.

State-of-the art methods of decreasing air-conditioning loads, i.e., power or energy needed to expel heat, have included reducing transmission of solar radiation through the windows by absorption and/or reflection of some of the radiation (see, e.g., U.S. Pat. No. 5,593,929 issued to Krumwiede et al., U.S. Pat. No. 4,943,484 issued to Goodman, U.S. Pat. No. 5,149,351 issued to Yaba et al.). However, the Federal Illuminant A Standard requires that automobile windows must transmit at least seventy percent (70%) of the visible light spectrum, and many consumers dislike heavily tinted windows in vehicles. Further, solar energy absorbed in the window glass heats the window, and a substantial amount of the window heat transfers by radiation and convection into the passenger cabin where it is not wanted. Shades or sun screens positioned adjacent inside surfaces of windows, such as those taught by Miller, U.S. Pat. No. 4,790,591, provide protection against deterioration of interior passenger cabin components, such as plastics, that are susceptible to ultraviolet light and reduces some heat build-up by reflecting ultraviolet light back through the window to the outside. However, not only do such shades and sun screens also absorb solar energy and dissipate such absorbed energy inside the passenger cabin as heat, but much of the solar radiation reflected by the shades or sun screens back to the window is also absorbed by the window and results in adding to heat build-up in the passenger cabin, as described above.

Fans have also been used to reduce solar loads on vehicles by removing hot air from the passenger cabin in two ways.

First, fans with high capacities have been used to exhaust hot air quickly from the passenger cabin when the vehicle is first started. Second, lower capacity fans have been used to prevent heat build-up by running constantly to exhaust heated air from the passenger cabin continuously while the vehicle is not in use. The high capacity purge systems, however, require substantial power to operate and may require a costly redesign of the vehicle ventilation system. Due to cost, space requirements, and other considerations, these purge systems have not been widely adopted by the transportation industry, even in times of inexpensive energy availability, and they are even more impractical in vehicles designed to maximize energy efficiency. Alternative hot air exhaust systems in which lower capacity fans are operated to exhaust hot air continuously over extended periods of time, instead of immediate high capacity purging on demand. Such lower capacity fans are more energy efficient and can even be powered by solar cells and, some have even been developed as after-market accessories that can be mounted on vehicle sun roofs or on upper edges of side windows that can be rolled down or lowered slightly to provide an opening to the outside. However, convective air currents continue to carry heat conducted from solar heated windows throughout the interior of a passenger cabin, thereby resulting in a large volume of hot air filing the cabin that would have to be continually purged or exhausted in order to lower interior temperatures. Moving such large volumes of air is difficult to accomplish with lower capacity fans, even if such fans are operated continuously.

Consequently, in spite of partial successes and benefits of such efforts as selective solar radiation and absorption as well as hot air purge or exhaust systems to reduce heating effects of solar radiation on parked vehicles, and specifically to reduce cooling loads and corresponding auxiliary power load (i.e., reduce power consumption by the vehicle's air conditioning system) in order to improve fuel efficiency and reduce tailpipe emissions, none of these techniques has yet been practical or effective for maintaining interiors of parked vehicles at or near ambient temperatures on hot, sunny days while complying with federal standards for visible light transmittance and the desires of consumers for limited coloration or tint in vehicle windows.

SUMMARY OF THE INVENTION

Accordingly, it is a general object of the present invention to improve fuel efficiencies and minimize tailpipe emissions of conventional and hybrid vehicles by reducing heat build-up and consequent cooling or air-conditioning loads in passenger compartments or cabins of such vehicles.

It is a related object of the present invention to reduce auxiliary power loads placed on engines or motors of vehicles by air-conditioning systems used for cooling passenger compartments or cabins.

It is a specific object of the present invention to maintain lower temperatures within cabins of vehicles exposed to solar radiation with minimal power consumption.

It is a related specific object of the present invention to reduce air conditioning cooling loads of vehicles and corresponding power consumption of air conditioning systems.

It is another object of the present invention to increase service lives of, while reducing costs for, materials and equipment inside passenger compartments or cabins of vehicles parked in the sun for extended periods of time by reducing green house-type heat build-up inside such passenger compartments or cabins.

Additional objects, advantages, and novel features of the invention are set forth in part in the description that follows and will become apparent to those skilled in the art upon examination of the following description and figures or may be learned by practicing the invention. Further, the objects and the advantages of the invention may be realized and attained by means of the instrumentalities and in combinations particularly pointed out in the appended claims.

To achieve the foregoing and other objects and in accordance with the purposes of the present invention, as embodied and broadly described herein, a cabin cooling system maintains lower temperatures in an enclosed space, such as a passenger compartment of a vehicle, by capturing and exhausting boundary layers of heated air formed adjacent at least one interior heated surface, such as the interior surface of a window. The cabin cooling system broadly comprises a cooling duct with at least one inlet disposed adjacent the interior surface of the window, a fan in the cooling duct for drawing the boundary layers of heated air into the inlet, and an outlet disposed outside of the enclosed space or vehicle interior. Preferably, the cooling duct includes an end distal to the fan and an end proximal to the fan and has a cross-sectional area that increases from the distal end to the proximal end to create a substantially uniform pressure drop as the heated air is drawn through the cooling duct. In one embodiment of the invention, a preferred flow rate of the heated air drawn into the inlet of the cooling duct is a function of height of the window or other heated surface at which the boundary layer of heated air is created. The boundary layer exhaust apparatus of the cabin cooling system may also be combined with reflective or absorptive glazing or film layer adhered to a surface of the window or a removable shade assembly that may be substantially transparent to visible light and have infrared reflective properties or may be heavily tinted, such as rear and back windows in light duty vehicles in order to optimize sufficient visible light transmission for vision with capture and removal of heat derived from absorbed solar energy. Preferably, the reflective glazing or removable shade blocks at least 50 percent of the total solar radiation from entering the interior of the vehicle. Also, in one preferred embodiment, the upper edge of the window and screen assembly is adjacent, and extends parallel to, the inlet of the cooling duct, thereby enabling the boundary layers of heat to be more easily drawn into the cooling duct.

The present invention also contemplates a method for reducing heat build-up within an enclosed space having a heated surface, such as a window, with at least one boundary layer of heated air adjacent the surface by capturing and exhausting the boundary layer of heated air to prevent such boundary layer of heated air from mixing with other air in the enclosed space. The method may include drawing the boundary layer of heated air into a cooling duct with an inlet disposal near and above the upper edge of the heated surface and exhausting the heated air from an exhaust outlet of the duct disposed outside the enclosed space. The method can also include using a fan in the cooling duct to draw, i.e., overcome the pressure drop in the cooling duct, the boundary layer of heated air into the inlet and through the cooling duct at a predetermined flow rate and discharging the heated air through the outlet to a space outside of the enclosed space. Preferably, the fan has a volumetric flow rate capacity that is selected to substantially capture the gases (i.e., air) in the boundary layer of heated air.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

In the Drawings.

DETAILED DESCRIPTION OF THE PREFERRED EMBODIMENTS

Figure 1:
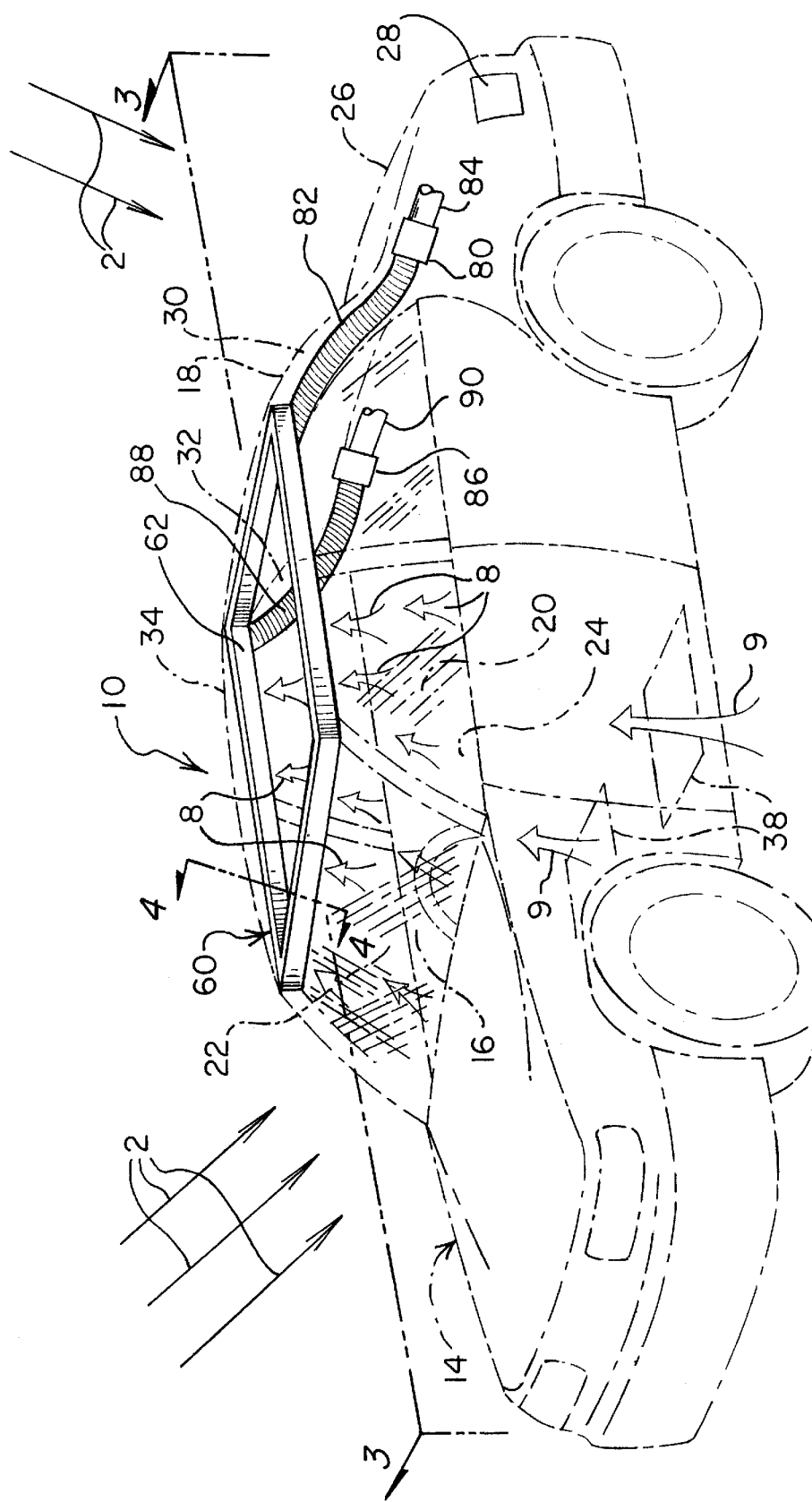
FIG. 1 is an isometric view of a vehicle cabin cooling system comprising the boundary layer capture and exhaust apparatus of the present invention installed within a vehicle that is shown in phantom lines.

The cabin cooling system 10 of the present invention shown in FIGS. 1–5 includes boundary layer air capture and exhaust apparatus that selectively draws in air 8 flowing in thin, laminar-flow, boundary layers formed along solar-heated, interior surfaces of windshield 16 and other windows 18, 20, 22 of a vehicle 14. By selectively capturing the laminar flow boundary layers of heated air to the substantial exclusion of other air in the vehicle passenger cabin and discharging or exhausting that heated air 8 outside the passenger cabin, the cabin cooling system 10 effectively exhausts heat in absorbed in the air 8 and also inhibits transfer of heat by gas, i.e., air, conductance farther into the interior cabin of the vehicle 14.

Figure 4:
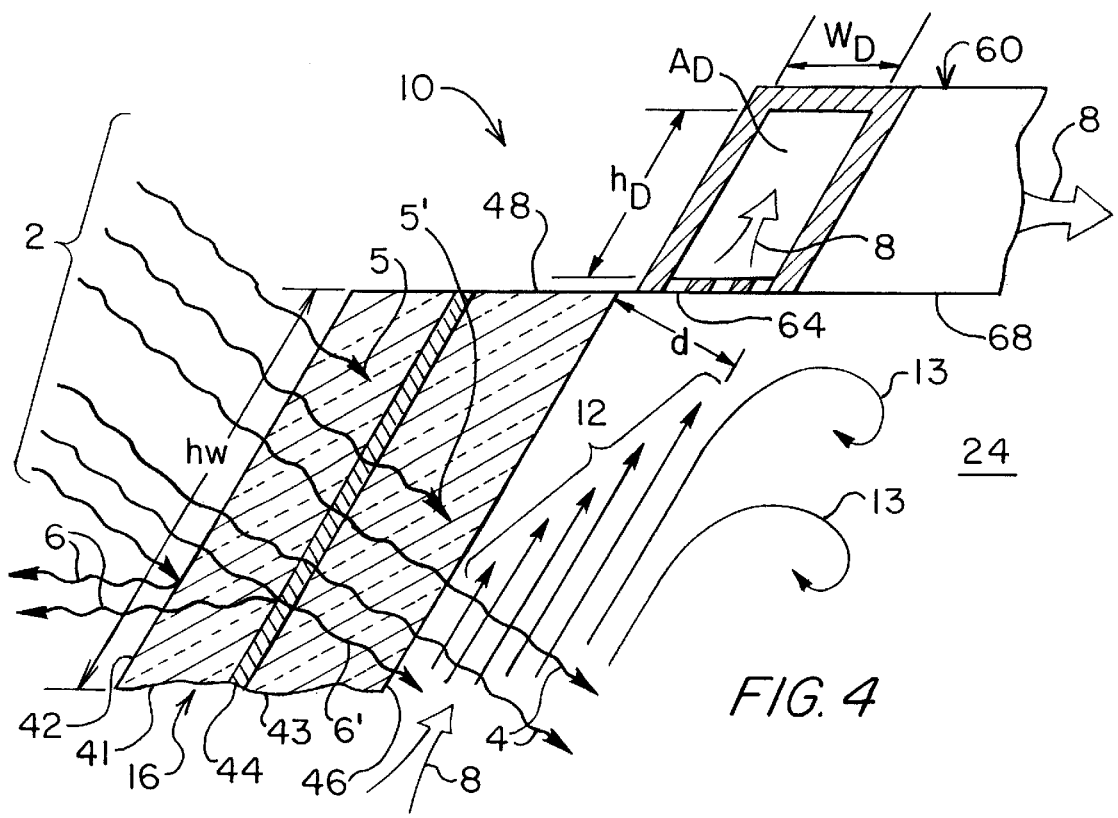
FIG. 4 is a cross-sectional view of a window and a cooling duct of the present invention showing the development of a flowing boundary layer of air adjacent the window, taken along line 4—4 of FIG. 1.

Referring briefly to the windshield 16 cross-section of FIG. 4, some solar radiation 2 that is incident on the windshield 16 is transmitted 3 by the windshield 16 into the interior passenger cabin 24. Some of the incident solar radiation 2 is reflected 6 either by the exterior surface 42 of the windshield 16 or by an inner reflective layer 44, which will be described in more detail below, and some of the incident solar radiation 2 is absorbed 5 by the windshield 16 or by an inner reflective layer 44, which will be described in more detail below, and some of the incident solar radiation 2 is absorbed 5 by the windshield 16. The energy of the absorbed solar radiation 5 heats the windshield 16. As the windshield 16 becomes hot, it dissipates heat energy in several modes. For example, some heat energy is re-radiated from the windshield 16 as infrared radiation (not show). Much of the heat energy in the windshield, however, is transferred by conduction to gas molecules that comprise the air that contracts both the internal surface 46 and the external surface 42 of the window. Of course, heat energy transmitted by conduction to air on the exterior surface 42 gets dissipated into the ambient environment and is of no concern. On the other hand, heat energy that is transferred by conduction to gas (air) molecules that contact the interior surface 46 of the windshield 16 will heat the interior of the passenger compartment 24 if it is not removed.

Initially, the gas (air) molecules that absorb heat energy from the hot interior surface 46 of the windshield 16 form a boundary layer of hot air immediately adjacent the interior surface. However, the hot air is less dense than cooler air and rises to create convective air flows, which carry the heat energy to divers portions of the passenger compartment. Such convective air flows adjacent the interior surface 46 of windshield 16 are laminar, as indicated by flow arrows 12 in FIG. 4, which does not separate the boundary layer from the interior surface 46, so that the convective air flow is substantially parallel to the surface 46 for some distance d outwardly from the surface 46. Farther away from the surface 46, the laminar convective air flow interfaces with non-boundary layer air and becomes non-linear or turbulent, as indicated by the vortice flow arrows 13, which mixes the air molecules heated by the windshield 16 with air molecules throughout the interior of the passenger compartment 24. The result of such mixing is heating and consequent raising of the temperature of all the air in the cabin or passenger compartment 24.

The cabin cooling system 10 of the present invention comprises a cooling ventilation assembly 60 that captures the hot air from the boundary layer 12 flowing parallel to the window surface 46 before it can mix with air in the rest of the passenger compartment 24 and exhausts it outside so that it cannot contribute to heat build-up in the passenger compartment 24. The power required to draw the laminar flowing boundary layer 12 hot air into the inlets 48 of the duct 68 is minimal, because: (i) the boundary layer 12 is very thin and its volume is very small; (ii) it is already flowing upwardly along the window surface 46 due to decreased density from heating, as described above; (iii) it is preferable to keep the volumetric flow rate of the air flow high enough to capture all the hot boundary layer air flowing upwardly along the window surface, but low enough to avoid creating turbulent flow that could separate the boundary layer from the window surface 46 and/or cause mixing of the hot boundary layer air with other air in the passenger compartment 24 before it can be captured.

Of course, the cooling ventilation assembly 60 can also be operated while the vehicle 14 is being operated to minimize the air conditioner load while the vehicle 14 is occupied.

Figure 2:
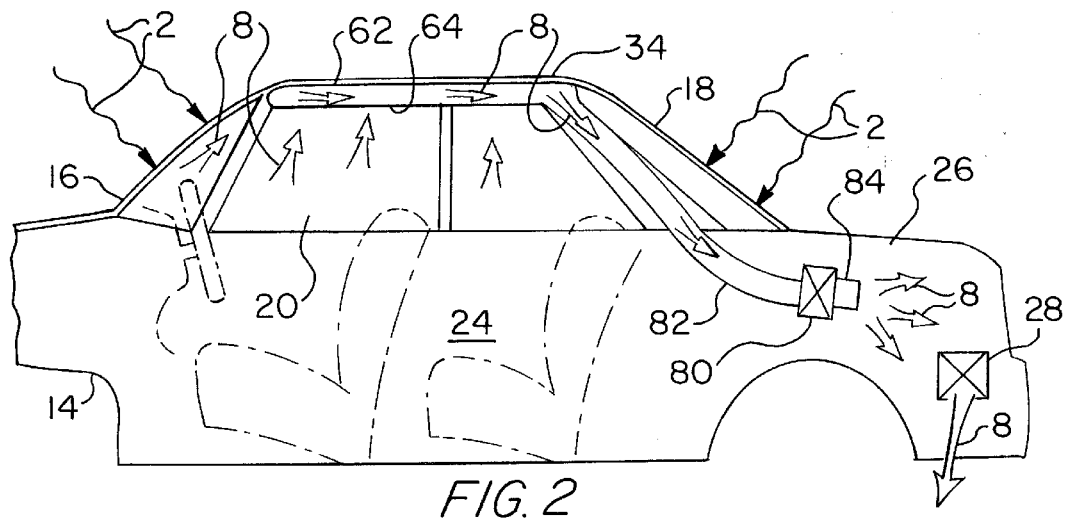
FIG. 2 is a partial elevational view showing hot air flow paths within the vehicle cabin cooling system of FIG. 1.
Figure 3:
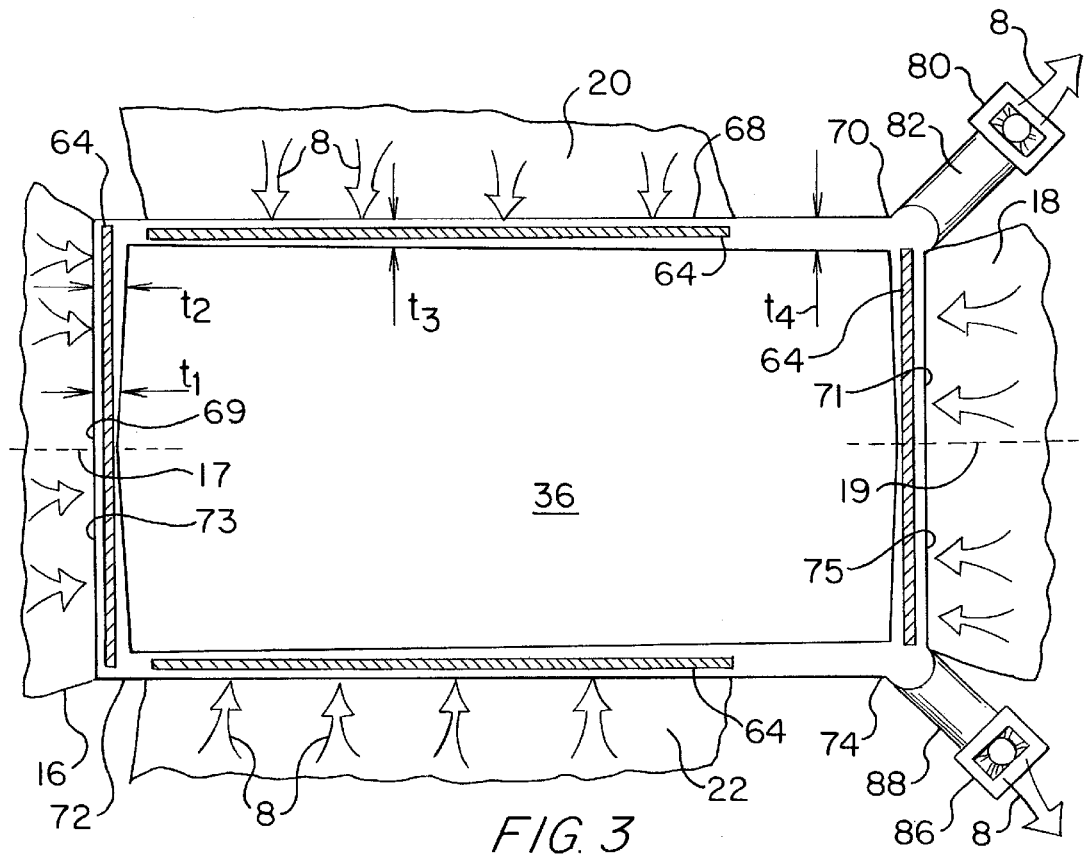
FIG. 3 is a partial upward view of the vehicle cabin cooling system of the present invention, taken along line 3—3 of FIG. 1.

Referring now to FIGS. 1–3, the cabin cooling system 10 for a vehicle 14 according to the present invention may comprise a cooling ventilation assembly 60, which includes a cooling duct 62 having air inlets 64 positioned adjacent the top edges of the windshield 16 and windows 18, 20, 22. The cooling duct 62 may be installed within a standard vehicle head liner 36 of roof 34 of the vehicle 14. The windshield 16, rear window 18, left window 20, and right window 22 of the vehicle 14 absorb a portion of the solar radiation 2 that strikes the windshield 16 and windows 18, 20, 22, thus preventing that portion of the solar radiation 2 from being transmitted into the interior 24 of the vehicle as described above. The energy of the solar radiation absorbed by the windshield 16 and windows 18, 20, 22 such absorption, turns to heat (as will be discussed in more detail below), which causes the windshield 16 and windows 18, 20, 22 to become hot. The hot windshield 16 and windows 18, 20, 22 heat a boundary layer of the air 8 adjacent the interior surfaces of the windshield 16 and windows 18, 20, 22. The heated air 8 becomes less dense and rises naturally to develop temperature gradients and is drawn into the cooling duct 62 via air inlets 64 by the left fan 80 and the right fan 86 in left and right fan inlet ducts 82, 88, respectively, or by any other device that creates a pressure gradient to draw heated air 8 into the cooling duct 62. The fans 80, 86 push the heated air 8 out of the vehicle 14 through left and right fan outlets 84, 90, which although shown in the trunk 26 of the vehicle 14, may be at any convenient location on the vehicle 14.

Air inlet vents 38 are provided, preferably in or near the bottom of the vehicle 14, to allow exterior air 9 to flow into the vehicle 14 to make-up for air 8 that is exhausted by the cooling ventilation assembly 60. The air inlet vents 38 may take a variety of shapes and designs well- known in the industry and may be located in any of a number of locations, such as in the floorboards of the vehicle 14, as illustrated in FIG. 1. The heated air 8 is then conducted by cooling duct 62 toward the rear of the vehicle 14, where the heated air 8 passes through left and right fan inlet ducts 82, 88, left and right fans 80, 86, and left and right fan outlets 84, 90 for discharge into the trunk 26 of the vehicle 14. The heated air 8 circulates in the trunk 26 until the pressure in the trunk 26 is large enough to open a pressure relief vent(s) 28, e.g., a relief vent commonly installed in currently produced vehicles, to enable exhaust of the heated air 8 from the trunk 26 to the exterior environment.

In the above manner and as will become clear from the following description, the cabin cooling system 10 of the present invention provides effective control of solar caused heat build-up within the vehicle 14 by exhausting interior air 8 as it forms a hot boundary layer adjacent interior surfaces of windows 16, 18, 20, 22 and before significant mixing of the hot boundary layer air 8 with cooler interior air occurs, thereby reducing the cooling load of an air conditioning system (not shown) for the vehicle 14. The structure and resulting functional advantages of the components of the cabin cooling system 10 that work in combination to maintain lower temperatures within the vehicle 14 are described in detail below.

As noted above, the cabin cooling system 10 is effective in exhausting boundary layer air 8 as it is heated by windows of the vehicle 14 and in this regard, the cabin cooling system 10 works in conjunction with windshield 16, rear window 18, left window 20, and right window 22 to selectively transmit, reflect, and absorb portions of the solar radiation 2 that strike windows of the vehicle 14. A wide variety of known vehicle glass designs or configurations, including treated glass, coated or layered glass assemblies, and glass with films, may be used to transmit visible light and absorb and/or reflect at least a portion of the ultraviolet (UV) and infrared (IR) radiation as a part of the cabin cooling system 10 according to this invention.

The windshield 16 and forward side windows may have to be fabricated in compliance with the Federal Illuminant A Standard, which requires that those windows transmit at least 70 percent of incident solar radiation in the visible light spectrum, i.e., wavelengths of 400 to 700 millimicrons, for driver and law enforcement personnel safety. In certain vehicles, e.g., light-duty vehicles, the rear side and the back windows can be tinted more heavily to absorb a large portion of incident solar radiation. Each of these windows is preferably fabricated to block (i.e., not transmit) at least about 50 percent of the total incident solar radiation. Further, in this regard, it is preferable to block UV radiation (i.e., wavelengths of 300 to 400 millimicrons) to protect passengers and interior materials and to block IR radiation (i.e., wavelengths of 700 to 2500 millimicrons) to reduce heating of interior surfaces. While this solar radiation blocking effect can be achieved with absorption and/or with reflection of the received solar radiation, it may be desirable that a significant portion of the solar radiation is reflected to reduce the solar load, because radiation that is absorbed may be reradiated to interior surfaces of the vehicle and/or may be transferred by conduction in the form of heat to adjacent air. However, such highly reflective windows may not be aesthetically pleasing. As an alternative, the window can be tinted more heavily to absorb solar radiation, which causes the temperature of the window to increase significantly and creates a laminar-flow boundary layer. Regardless of which one of these described windows is used, all of them will absorb at least a portion of the solar radiation and become a heat source for the vehicle interior. Therefore, an important feature of the present invention is that the air heated from solar radiation absorbed by the windows is captured and exhausted on an ongoing basis by the cabin cooling system 10, thereby effectively controlling heat build-up in the cabin 24.

To further explain the function and importance of windows (i.e., windshield 16, rear window 18, left window 20, and right window 22) within the cabin cooling system 10, FIG. 4 illustrates a cross-sectional view of the windshield 16 and a portion of the cooling duct 62. While the windshield 16 is discussed here to describe the invention, the invention functions the same for the other windows 18, 20, 22. therefore, unless otherwise noted, the description of the invention in relation to the windshield 16 applies to the invention in relation to the other windows 18, 20, 22 as well.

As illustrated in FIG. 4, the windshield 16 comprises an outer sheet 41 with an outer surface 42 laminated together with an inner sheet 43 with an inner surface 46, and it can, but does not have to have, a reflective and/or absorptive layer 44 sandwiched between the outer sheet 41 and the inner sheet 43. The outer sheet 41 and the inner sheet 43 can be formed from a variety of standard glasses and other materials utilized in fabricating vehicle windows, such as silica-based glasses, and they may be treated and/or tinted to absorb UV radiation by adding metal oxides as disclosed in U.S. Pat. No. 5,593,929 issued to Krumwiede et al or as disclosed in U.S. Pat. No. 5,149,351 issued to Yaba et al. The reflective layer 44 may comprise a thin layer of a metal such as silver, gold, copper, aluminum, and the like to meet the 70 percent transmission of radiation in the visible spectrum design criteria, as discussed above, while also providing a desirable amount of solar reflection. As an example, but not as a limitation, total solar reflection greater than 25 percent may be provided by the reflective layer 44 to reduce the solar load placed on the vehicle 14. More specifically, the inventors have discovered that the windshield 16 may be the Sungate produced by PPG Industries, Inc., Pittsburgh, PA, which includes a thin silver layer sandwiched between two solar radiation absorbing layers. As will be understood, the windshield 16 may be fabricated without an inner sheet 43 and with a number of other combinations of layers of glasses, tinted for absorption or substantially transparent, and other materials not shown but well-known in the transportation industry.

With continuing reference to FIG. 4, the solar radiation 2 strikes the outer surface 42 with a small portion 5 being absorbed and the unabsorbed solar radiation 2 being transmitted to the reflective surface 44. The reflective surface 44 transmits a portion 6' of the solar radiation 2 and reflects the remaining radiation 6. This reflected radiation 6 is mainly IR and UV radiation and may represent a significant portion of the total solar radiation 2 received, e.g., 25 percent or more, by the windshield 16. Another portion 5' of the solar radiation 2 that is not absorbed by the outer sheet 41 and not reflected by the reflective layer 44 is transmitted to the inner layer 43 in which that portion 5' of the total solar radiation 2 is absorbed. The remaining portion 4 of the solar radiation 2, comprising mostly visible light and IR radiation, is transmitted by the windshield 16 into the vehicle interior 24. As the materials of the inner sheet 43, reflective/absorptive layer 44, and outer sheet 41 absorb solar radiation 2, the temperature of the inner surface 46 increases relative to air in the vehicle interior 24. As the temperature increases, the inner surface 46 will re-radiate a portion of the absorbed energy primarily as infrared radiation that will strike interior 24 surfaces (not shown), with the wavelength of this radiation depending upon its temperature. Additionally, the higher temperature inner surface 46 will transfer heat by conduction to the air 8 adjacent the inner surface 46. The convective heat transfer process from the inner surface 46 generally occurs in a thin fluid layer, commonly referred to as a boundary layer, in which the heated air 8 flows upward in a laminar manner as indicated by 12 at an average flow rate that varies with the temperature gradient between inner surface 46 and cooler interior air.

A significant feature of the present invention is the configuration of the cabin cooling system 10 to effectively maintain the interior 24 of the vehicle 14 at a desired lower temperature by capturing and exhausting air 8 that is heated by inner surface 46 of vehicle window 16 and that flows upwardly in the laminar flowing boundary layer 12. The inventors have determined that the cooling efficiency of the cabin cooling system 10 is improved when the cooling ventilation assembly 60 draws air mostly from the boundary layer laminar flow 12 that is parallel to the inner surface 46 of the windshield 16 at a volumetric flow rate that captures substantially all of the hot air 8 in the boundary layer 12 without capturing a significant volume of unheated interior air. Capturing unheated interior air would maintain the vehicle 14 at a lower temperature but may unnecessarily increase the size, i.e., capacity, of the fans 80, 86 and increase the corresponding cabin cooling system 10 power requirements. The volumetric flow rate needed to capture the laminar flowing boundary layer 12 varies with the magnitude of the solar gains and the area of the window 16 (generally, height, $h_w$, of the window multiplied by linear feet of window). A larger height, $h_w$, window, thus, large area window with higher solar gain, requiring a larger flow rate to better exhaust the boundary layer 12 (i.e., limit mixing of air prior to the hot air 8 reaching the upper edge 48 of the windshield 16). This variable volumetric flow rate also better controls the heating of the hot air 8 by the inner surface 46 and helps to control the thickness d of the boundary layer 12 (to match this thickness with the dimensions of the hot air inlet 64).

During operation of the cabin cooling system 10, the boundary layer 12 has a relatively uniform thickness d, e.g., 0.5 inches or less. The preferred fan flow rate is selected to be low enough to allow a boundary layer 12 to form, i.e., a limited amount of heat transfer from the inner surface 46 to the heated air 8, but not so low that heated air 8 flows naturally into the interior 24 and heats the vehicle 14. In many standard design vehicles with windows ranging in height, $h_w$, from about 16 to 20 inches and corresponding window area, a flow rate of at least about 0.5 cfm per linear length of window, as measured at the upper surface 48 of the windshield 16, has been determined to efficiently exhaust a substantial volume of the hot air 8 in the boundary layer 12 without exhausting a significant volume of unheated interior air. With larger area windows, the fan flow rate would preferably be increased to better exhaust the boundary layer, and for many vehicles the flow rate may be 2 to 2.5 cfm per linear length of window or higher. At the same time, a fan with too large a flow rate capacity could be counter-productive by creating vortices and/or turbulence in place of laminar flow through some or all of the width d, thus breaking down the boundary layer 12 and causing unwanted mixing of the heated air with cooler air in the cabin 24.

In this regard, a related important feature of the present invention is the configuration of the cooling ventilation assembly 60 to achieve a predetermined flow rate at each point along the upper edge 48 of each windshield 16 of the vehicle 14 to substantially exhaust only the hot air 8 flowing in a boundary layer 12 adjacent inner surface 46 of the windshield 16. The inventors have discovered that a single uniform flow rate may be effective and preferable in vehicles 14 which have window heights, $h_w$, falling within a relatively narrow range. The uniform flow rate for a standard vehicle may be at least about 0.5 cfm per linear foot, but preferably may be 2 to 2.5 cfm per linear foot or possibly higher, such as 5.0 cfm, as measured per length of window along the upper edge 48 of windshield 16, to achieve the design goal of capturing the heated air 8. As will be understood by those skilled in the art, the uniform flow rate above the windows and throughout the length of cooling duct 62 facilitates selection of fans 80, 86 with lower capacities (capacity to provide a desired uniform flow rate plus capacity to account for losses in cooling duct 62) and reduced power requirements. Alternatively, a nonuniform flow rate may decrease along the cooling duct 62 from a maximum flow rate at a location proximal to the suction device (i.e., fans 80, 86) to a minimum flow rate at a distal location of the cooling duct 62, for example, at the midpoint 17 of the windshield 16. The minimum flow rate is selected to draw in or suction all or some smaller portion of the hot air 8 in the boundary layer 12 at this distal location. As will be understood by those skilled in the art, the nonuniform flow rate configuration of the cabin cooling system 10 requires fans 80, 86 with larger volumetric capacities and power requirements to provide at least this minimum flow rate throughout the cooling duct 62; a larger flow rate is provided throughout most of the cooling duct 62, resulting in unheated, cooler interior air being exhausted from the vehicle 14. However, a uniform cross-sectional area, $A_D$, may be desirable to reduce the cost of manufacture and installation, and this non-tapering cooling duct 62 may readily be utilized by oversizing the cooling duct 62 in portions distal to the fans 80, 86. The structure and resulting functional advantages of the cabin cooling system 10 components that provide effective exhaust of the hot air 8 in the boundary layer 12 adjacent windows 16 through uniform and nonuniform flow rates in cooling duct 62 are described in more detail below.

Figure 7:
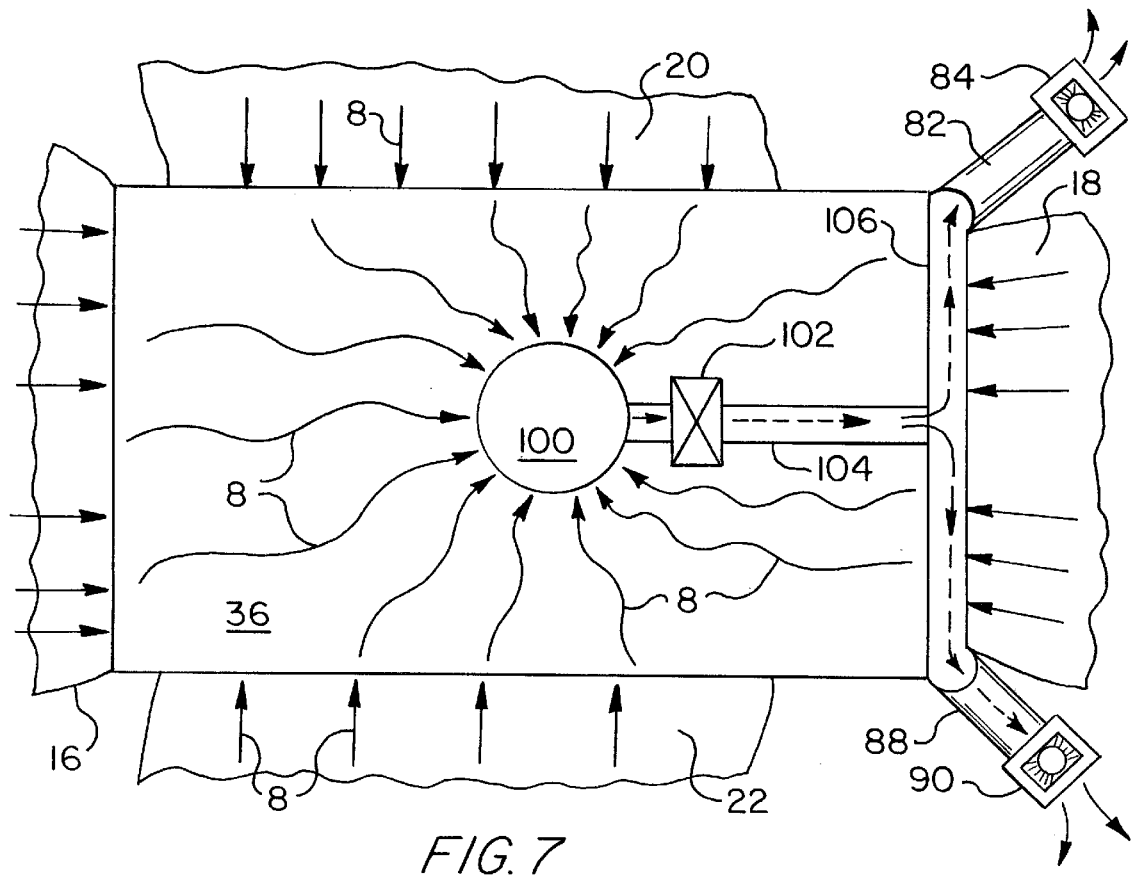
FIG. 7 is a partial upward view, similar to FIG. 3, of the vehicle cabin cooling system of FIG. 6.

Referring to FIGS. 1–3, the cabin cooling system 10 includes left fan 80 and right fan 86 to draw hot air 8 from the vehicle interior 24 into and through the cooling duct 62 and to exhaust the drawn hot air 8 out of the vehicle interior 24. In this regard, the capacities of the fans 80, 86 are selected to provide a predetermined flow rate(s) throughout the cooling duct 62 with the specific capacities depending upon, among other criteria, the flow rate(s) desired, as discussed above, and the anticipated pressure drops in the cooling duct 62. For illustration, but not as a limitation, the total capacity of the fans 80, 86 may range from about 5 cfm to 20 cfm for many standard sized vehicles in which a preferred uniform or minimum flow rate along the tops of included windows may be at least about 0.5 cfm per linear foot, and often may be 2 to 2.5 cfm per linear foot or higher. As will be understood by those skilled in the art, the desired capacity may be provided through a large number of alternative configurations, including varying numbers (e.g., one or more) and types (e.g., centrifugal, axial, and the like) of fans and fan locations within the vehicle 14. As illustrated in FIG. 7, a single fan 102 located in the headliner 36 may be utilized to provide the proper flow rate to capture and exhaust the boundary layers.

In a preferred embodiment, and as illustrated, a left fan 80 and a right fan 86 are included and may be 12 volt, DC axial fans operated in parallel to draw air from the left and right sides of the vehicle 14, respectively, at substantially the same flow rate. Clearly, the voltage and size of the fans may vary with the size of the vehicle and corresponding, total amount of window area and may also vary depending upon whether the vehicle is a conventional fueled vehicle, an HEV, or an EV. Although not illustrated, the power source for the fans 80, 86 may be a dedicated solar cell(s) or the vehicle battery.

Additionally, the cabin cooling system 10 preferably includes an automatic control device (not shown but well known in the art) to allow selective operation of the fans 84, 90. The control device may be used in connection with at least one sensing device (not shown) that may sense a number of useful parameters such as the temperature of interior air or interior surfaces and the receipt of solar radiation by the windows 16, 18, 20, 22. The sensing device(s) may be selected to transmit a signal to the control device which operates the fan 84, 90 in response to certain conditions or selected parameters. For example, the control device may be set to operate the fans when solar radiation is being received, thus, only operating during the day, and/or when the temperature of the interior air reaches a minimum temperature, such as 80° F. to 95° F. In the warmer months, then, the fans 84, 90 may operate nearly continuously, but not at all during winter months. The flow rate through the cooling duct 62 may be further regulated by the control device by operating only one of the fans 84 or 90 or, alternately, by providing multi-speed or capacity fans 84, 90 that would operate at higher speeds when the sensed temperature is higher.

The left and right fans 80, 86, respectively, are connected to the cooling duct 62 with left fan and right fan inlet ducts 82, 88, respectively, which may be standard heating and cooling duct that is sized. For fans 80, 86, for example, 1 to 2 inch diameter, and for installation within the left rear and right rear A-pillars 30, 32 within the vehicle 14. Rather than a circular cooling duct, the inlet ducts 82, 88 may be flat and elliptical in shape to better conform to existing vehicle A-pillar structures. Further, the inlet ducts 82,88 may be fabricated as an integral part of the A-pillar structures, such as channels provided in the molded plastic so that a separate installation is not required in newly manufactured vehicles. The fans 80, 86 exhaust hot air 8 through fan outlets 84, 90 into the trunk 26 for exhaust through pressure relief valve(s) 28 a location on the exterior of the vehicle 14. For vehicles without trunks (not shown) such as hatchbacks, vans, and trucks, the cabin cooling system 10 may readily be configured such that the fan outlets 84, 90 are positioned to exhaust the hot air 8 to a location exterior to the particular vehicle design.

As discussed above, the cooling duct 62 of the cooling ventilation assembly 60 is interconnected to the fans 80, 86 which provide a suction force that draws hot air 8 into the cooling duct 62 through the hot air inlet 64. The hot air inlet 64 is generally an elongate vent opening or grille in the cooling duct 62 with the same length dimensions as the upper edges 48 of the windows 16. Referring to FIGS. 3 and 4, the cooling duct 62 is positioned in the headliner 36 of the vehicle 14 to be immediately adjacent the inner surface 46 of the windshield 16 and above the upper edge 48 of the windshield 16. This positioning results in a rectangularly shaped cooling duct 62 with hot air inlets 64 above the windshield 16, the rear window 18, the left window 20, and the right window 22 of the vehicle 14. A cross-sectional shape of the cooling duct 62 may be selected from a variety of shapes, such as circular and rectangular, with the final shape being selected to enable installation in the headliner 36, to facilitate fabrication, and to assist in control of pressure drops and air flow (to be discussed in more detail below). Similarly, the cooling duct 62 may be fabricated from a variety of materials, such as plastics and metals, and may be molded into the vehicle head liner 36 to reduce assembly and fabrication costs.

As illustrated in FIG. 4, the cooling duct 62 has a rectangular cross-section with the width of the hot air inlet 64 coinciding with the width, $W_D$, of the cooling duct 62. The width, $W_D$, of the cooling duct 62 is selected to be large enough to enable drawing or suction of the hot air 8 flowing in the boundary layer 12 into the cooling duct 62, with little or no hot air 8 flowing past the hot air inlet 64 to mix with cooler interior air. At the same time, it is preferred that the width $W_D$ should not be so large as to be drawing any substantial amounts of cooler air from the interior 24 outside the thickness d of the laminar flowing boundary layer 12 into the duct 62. In this regard, the width, $W_D$, of the cooling duct 62 is preferably about the same as the width d of the boundary layer 12 plus or minus 20%, e.g., about one half inch or less, minus the wall thickness of the cooling duct 62, to capture substantially all of the hot air 8 in the laminar flowing boundary layer 12.

Another significant feature of the present invention is the configuration of the cooling duct 62 to control the flow of hot air 8 to obtain a desired flow rate of hot air 8 into the hot air inlet 64 along the upper edges of windshield 16, rear window 18, left window 20, and right window 22. This selected cooling duct configuration enables the cabin cooling system 10 to have some control or influence over the formation and exhaust of boundary layers 10. As will be understood by those skilled in the art, the flow rate in the cooling duct 62 may be determined, in part, by selection of the duct shape and cross-sectional area, $A_D$, which, as illustrated, is duct width, $W_D$, multiplied by duct height, $h_D$. The pressure drop in ventilation ducts due to friction losses is directly related to the shape and cross-sectional area, $A_D$, of the duct, i.e., the smaller the duct area, AD, the higher the pressure drop at the same flow rate as measured in cfm. While a rectangular cross-section for the cooling duct 62 is illustrated, friction losses would have similar effects in ducts with other shapes, such as circular, which may readily be utilized according to the present invention.

As discussed above, a nonuniform flow rate with a minimum flow rate at the midpoint 17 of the windshield 16 may be utilized to successfully practice the present invention. In the nonuniform flow rate embodiment, the duct area, $A_D$, may be uniform along the length of the cooling duct 62 with the fans 80, 86 being selected to provide enough capacity to overcome pressure drops in the cooling duct 62 and to obtain the desired minimum flow rate. While requiring larger capacity fans 80, 86, the use of a uniform duct area, $A_D$, may be advantageous in reducing duct manufacturing and duct installation costs.

In contrast, in the uniform flow rate embodiment of the present invention, as illustrated in FIG. 3, the duct area, $A_D$, may be varied along the length of the cooling duct 62 to obtain a substantially uniform flow rate, cfm, throughout the length of the cooling duct 62. By varying the duct area, $A_D$, a uniform pressure drop due to friction losses may be predictably developed along the length of the cooling duct 62 producing a desired uniform flow rate, with only small variations, along the upper edges 48 of the windows 16 by the suction pressure created by fans 80, 86.

In the illustrated embodiment of FIG. 3, a substantially uniform flow rate is developed throughout the cooling duct 62, and especially above the windshield 16, the rear window 18, the left window 20, and the right window 22, by utilizing a symmetric design in which the desired flow rate is created in the left and right side of the cooling duct 62 by the left and right fans 80, 86, respectively. In this regard, the cooling duct 62 comprises a left section 68 and a right section 72 each having distal ends 69, 73, respectively, at the midpoint 17 of the windshield 16 and proximal ends 70, 74, respectively, near the left and right fan inlet ducts 82, 88, respectively. Additionally, the left and right sections 68, 70 each include rear portions 71, 75 which draw in air 8 as it is heated by the rear window 18. Referring again to FIG. 3, the left section 68 of the cooling duct 62 varies in duct area, $A_D$, from a minimum at the distal end 69 to a maximum at the proximal end 70, thereby developing a substantially uniform pressure drop and flow rate induced by the suction pressure at the hot air inlet 64 in the left section 68 of the cooling duct 62.

As shown, the left section 68 of the cooling duct 62 increases in thickness, t, from the distal end 69 to the proximal end 70 nearest the fan 80, thereby providing a tapering of the cooling duct 62. The thickness, t, increases gradually along the left section 68 of the cooling duct 62 and is illustrated by $t_1$, $t_2$, $t_3$, and $t_4$ (i.e., $t_1 < t_2 < t_3 < t_4$). As the thickness, t, increases, the duct area, AD, increases because the duct width, $W_D$, becomes larger without an increase in the wall thickness. (See FIG. 4.) A similar change in duct area, $A_D$, is utilized in the right section 72 of the cooling duct 62, as well as in the rear portions 71, 75 of the cooling duct 62 to control the flow rate of hot air 8 in these sections. The duct area, AD, may alternatively be varied by changing the height, $h_D$, of the cooling duct 62. Additionally, a uniform flow rate, and corresponding suction pressure and volumetric flow at the upper edges 48 of the windows 16, may be obtained by other methods including, but not limited to, installation of mechanical flow devices such as dampers, variation of the hot air inlet 64 configuration (i.e., width, shape, and the like), and selection of cooling duct 62 materials, surface roughness, and shape. In the above manner, the cabin cooling system 10 efficiently and effectively suctions hot air 8 flowing in boundary layers 12 from the inner surfaces 46 of windows 16 into the cooling duct 62 for exhaust from the vehicle 14, thereby maintaining a lower interior temperature within the vehicle 14.

Figure 5:
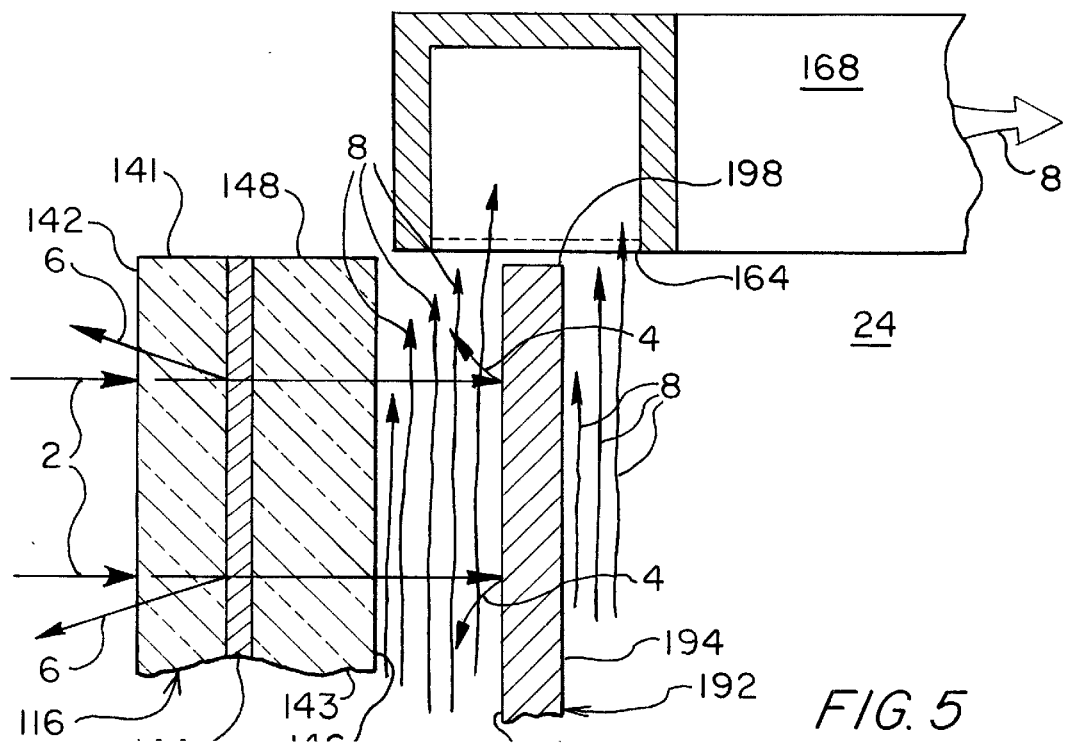
FIG. 5 is a cross-sectional view similar to FIG. 4 showing a window and a cooling duct being used in combination with a removable screen.

Referring to FIG. 5, a preferred embodiment of the cabin cooling system 10 is illustrated that includes a screen or shade 192 to further reduce the interior heat load of vehicle 14 by blocking solar radiation 2 from being transmitted to the vehicle interior 24. Solar radiation 2 strikes the window 116 in which a portion, such as UV radiation, is absorbed by outer and inner sheets 141, 143, respectively, and a portion, such as IR radiation, is reflected by reflective layer 144. The solar radiation 2 that is not absorbed or reflected by the window 116 is transmitted toward the interior 24 of the vehicle 14 where it strikes the screen 192. The screen 192 includes an inner surface 194, an outer surface 196 that is preferably a reflective material, such as Mylar™, to reduce radiative heat transfer from the screen 192 to the vehicle interior 24, and an upper edge 198. The screen 192 is preferably a removable or retractable screen or shade and may be one of many known designs ranging from manually installed cardboard or reflective shades to automatically retractable screens or shutters presently available in several currently produced luxury vehicles.

As the transmitted solar radiation 4 strikes the inner surface 196, a significant portion may be reflected back to the window 116 where a portion will be absorbed. The screen 192 generally absorbs the transmitted solar radiation 4 that is not reflected, which causes the inner and outer surfaces 194, 196, respectively, to become hot relative to adjacent air 8. Similarly, the window 116, and particularly the inner surface 146, becomes hot from solar radiation 2 and heats adjacent air 8. The heated air 8 flows upward in boundary layer 12 adjacent the inner surface 146 of the window 116, in boundary layer 195 adjacent the inner surface 194 of the screen 192, and in boundary layer 197 adjacent outer surface 196 of the screen 192. Preferably, the cooling duct 162 is positioned adjacent the inner surface 146 of the window 116 and above the window 116 and the screen 192 to capture the upwardly flowing hot air 8 to minimize convective heating by the window 116 and the screen 192. As illustrated, the screen 192 and cooling duct 162 are positioned relative to each other such that the upper edge 198 is at the midpoint of the cooling duct 162 cross-section. While other positioning may also be effective, this midway positioning of the upper edge 198 has been found to enable the cooling duct 162 to effectively suction (i.e., capture) the hot air 8 flowing adjacent both the inner and outer surfaces 194, 196, of the screen 192, thereby controlling convective heating of the interior 24 by the screen 192, as well as by the window 116.

Figure 6:
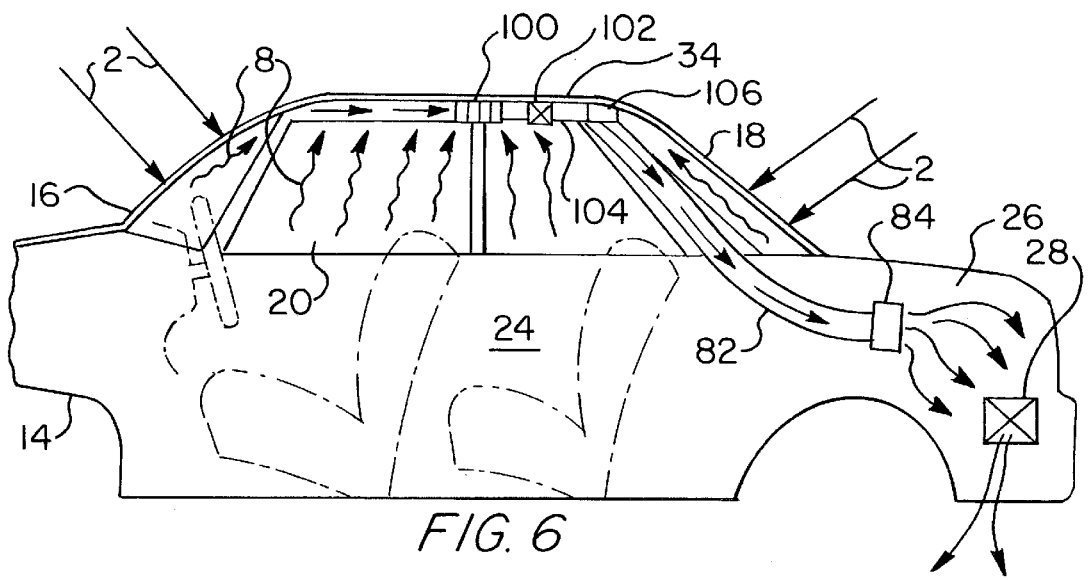
FIG. 6 is a partial elevational view showing hot air flow paths within an alternate vehicle cabin cooling system of the present invention.

Further, a number of alternate locations and equipment for exhausting the captured air 8, other than the pressure relief vent 28 of the trunk 26, may be utilized, such as vents in the cabin of the vehicle located in doors, floorboards, A-pillars, or any other convenient location. Additionally, the present invention may be successfully practiced with a number of cooling duct and inlet designs other than those illustrated in FIGS. 1–3 that are configured to encourage formation of boundary layers along the interior surfaces of the windows and capture of the heated air in such boundary layers with minimal mixing with cooler interior air. In this regard, FIGS. 6 and 7 illustrate a cooling duct or hood 100 with side inlets (not shown) which draws heated air 8 flowing in boundary layers. The air 8 is heated by the windows 16, 18, 20, 22 and flows naturally upward in a thin layer, i.e., about 1 centimeter in thickness. The cooling duct 100 (shown as circular, but other shapes including polygonal may be utilized) is positioned at about the center of the headliner 36 which generally corresponds with the highest point of the cabin of the vehicle 14. The fan 102 provides a drawing force large enough to overcome the pressure drop in the downstream outlet ducts 104, 106 and fan outlets 82 and 88. The air 8 remains in a boundary layer against the windows 16, 18, 20, 22 and also, against the headliner 36 until drawn into the cooling duct 100 and exhausted through left and right fan outlets 84, 90, respectively. Additional embodiments of a cooling duct, while not illustrated, may be envisioned. For example, but not as a limitation, the cooling duct may include a headliner that is itself fabricated with numerous inlets located adjacent and above the edges of the windows 16, 18, 20, 22. The molding may then contain integral passageways connected to these inlets that channel the hot air toward the fan(s) inlet for exhaust from the cabin of a vehicle, with the fan being located at any convenient location within the vehicle.

The method and apparatus of the present invention, as implemented in connection with the embodiments described in detail above, is applicable to a wide variety of enclosed space cooling applications. In particular, the present invention is advantageous in selectively exhausting gases that flow in a boundary layer as the gases are heated by an adjacent hot surface. Further, the present invention is particularly apt in windowed vehicles for discharging hot air flowing upward in thin boundary layers prior to the hot air mixing with cooler interior air. The inventors recognize that boundary layers form adjacent windows designed to absorb a significant portion of solar radiation striking the windows, and that by selectively capturing and discharging hot air in the boundary layers at about the same rate as the layers form, the interior temperatures of vehicles can be maintained well below soak temperatures to significantly reduce cooling loads for such vehicles.

The foregoing description is illustrative of the principles of the invention and provides a specific example of the cooling principles of the invention as applied to a vehicle interior, and for ease of illustration, a standard automobile design was shown in the attached figures. However, the above discussion should not be limited to the specific example shown but is expressly intended for other types of vehicles with windows in passenger compartments, such as trains, airplanes, and boats which face air conditioning challenges similar to those faced by the automotive industry. Further, those skilled in the art of cooling and ventilation will readily understand that the present invention may be successfully implemented, with or without modification as appropriate, to provide cooling for surfaces other than vehicle windows and for a wide variety of enclosed areas for which convective heating and/or heat build-up from a hot surface are design concerns. For example, but not as a limitation, the present invention is readily suited for capturing and exhausting boundary layers in buildings and other structures exposed to solar radiation.

Furthermore, since numerous modifications and changes will readily occur to those skilled in the art, it is not desired to limit the invention to the exact construction and process shown and described above, i.e., the present invention is not limited to a cabin cooling system for a vehicle or to a vehicle having the illustrated configuration. Accordingly, resort may be made to all suitable modifications and equivalents that fall within the scope of the invention as defined by the claims which follow. The words "comprise," "comprises," "comprising," "include," "including," and "includes" when used in this specification and in the following claims are intended to specify the presence of stated features, integers, components, or steps, but they do not preclude the presence or addition of one or more other features, integers, components, steps, or groups thereof.

The embodiments of the invention in which an exclusive property or privilege is claimed are defined as follows:

1. A cooling system for a passenger compartment of a vehicle that is partially enclosed by windows that get exposed to solar radiation, comprising:

glass comprising said windows that is partially transparent to incident solar radiation and absorptive of some incident solar radiation which glass gets hot upon absorption of solar radiation and transfers heat by conduction to air in said passenger compartment that contacts said glass, resulting in formation of a boundary layer of hot air having a width less than about 0.5 inches that flows upwardly in a laminar flow path adjacent said glass;

a duct having an inlet that is positioned in the passenger compartment adjacent the glass in said laminar flow path and an outlet that is positioned outside the passenger compartment, said inlet extending outward from the glass a distance equal to about the width of said boundary layer; and a fan positioned in said duct, said fan being operable in a manner that decreases pressure in said duct in relation to air pressure in said boundary layer to draw air in said laminar flow path into said duct and in a manner that exhausts said air out of said outlet.

2. A cabin cooling system for maintaining lower interior temperatures in a passenger cabin of a vehicle exposed to solar radiation by selectively exhausting boundary layers of heated air formed adjacent at least one interior surface of at least one window of the vehicle, said cabin cooling system comprising:

a cooling duct adjacent the window, said cooling duct including at least one inlet disposed proximate to said interior surface of the window;

at least one fan disposed within said cooling duct for drawing at least one of said boundary layers of heated air into said inlet and through said cooling duct at a predetermined flow rate of at least about 0.5 cubic feet per minute per linear foot as measured along an upper edge of the window;

at least one outlet formed in said cooling duct for discharging said boundary layer of heated air to the exterior of the cabin.

3. The cabin cooling system of claim 2, wherein said flow rate is substantially uniform such that the air drawn into the cooling duct is substantially heated air from the boundary layer.

4. The cabin cooling system of claim 3, said cabin cooling system further including at least one air inlet vent positioned on the vehicle and adapted to allow ambient air exterior to the vehicle to flow into the cabin at an inlet flow rate of about the flow rate of heated air through said cooling duct.

5. The cabin cooling system of claim 3, wherein the flow rate of the air drawn into the cooling duct is selected based on the height of the window.

6. The cabin cooling system of claim 3, wherein the uniform flow rate of the heated air is at least about 0.5 cubic feet per minute per linear foot and less than about 5 cubic feet per minute per linear foot as measured along an upper edge of the window.

7. The cabin cooling system of claim 3, wherein said cooling duct includes a distal end and a proximal end, said cooling duct having a cross-sectional area that increases from the distal end to the proximal end, thereby creating a substantially uniform pressure drop as the heated air is drawn through said cooling duct.

8. The cabin cooling system of claim 2, said cabin cooling system further including a control device for selectively operating said at least one fan in response to a signal from a sensor.

9. The cabin cooling system of claim 8, wherein said sensor is adapted to sense when solar radiation contacts the window.

10. The cabin cooling system of claim 8, wherein said sensor is adapted to sense temperature of ambient air within the cabin of the vehicle and transmit said signal when said sensed temperature exceeds a selected temperature.

11. The cabin cooling system of claim 10, said cabin cooling system including at least two fans that are selectively operable by said control device to operate individually and concurrently.

12. The cabin cooling system of claim 11, wherein said predetermined flow rate is set by said control device in response to the sensed temperature.

13. The cabin cooling system of claim 10, wherein said at least one fan has a variable capacity, whereby said predetermined flow rate is set by said control device in response to the sensed temperature.

14. The cabin cooling system of claim 2, wherein said outlet is disposed within a trunk of the vehicle.

15. The cabin cooling system of claim 14, wherein the trunk includes a pressure relief vent.

16. The cabin cooling system of claim 2, further comprising a radiation blocking layer mounted on the window, said radiation blocking layer being substantially transparent to visible light with infrared reflective properties.

17. The cabin cooling system of claim 16, wherein said radiation blocking layer blocks at least about 50 percent of the total solar radiation from entering the interior of the vehicle.

18. The cabin cooling system of claim 2, further comprising a removable screen mounted on the interior surface of the window for inhibiting the transfer of solar radiation and heat into the vehicle.

19. The cabin cooling system of claim 18, wherein said screen has an upper edge adjacent, and extending substantially parallel to, said inlet of said cooling duct, such that at least one boundary layer of heated air formed adjacent said screen is drawn into said cooling duct.

20. Cooling apparatus for controlling build up of heat within an enclosed space, the enclosed space defined by at least one surface having an elevated temperature relative to the enclosed space such that gases adjacent the surface are heated to an elevated temperature relative to surrounding gases within the enclosed space, the heated gases flowing upward adjacent the surface in a boundary layer, the cooling apparatus comprising:
  a cooling duct positioned above and proximate an upper edge of the surface, said cooling duct including a gas inlet;
  a fan in fluid communication with said cooling duct to draw gases heated by the at least one surface into said gas inlet and through said cooling duct at a predetermined flow rate, said fan having a volumetric flow rate capacity selected so as to substantially capture gases in the boundary layer substantially without capturing unheated air in the enclosed space; and
  a gas outlet downstream of said fan and outside of the enclosed space.

21. The cooling apparatus of claim 20, wherein said cooling duct is elongate and positioned adjacent the upper edge, and further wherein said flow rate of the gases drawn into said gas inlet is substantially uniform along the upper edge of the surface.

22. The cooling apparatus of claim 21, wherein said flow rate of the gases drawn into said gas inlet is determined based on area of the surface.

23. The cooling apparatus of claim 22, wherein said flow rate of the air is substantially uniform per linear length of the surface as measured from the upper edge of the surface and said flow rate is at least about 0.5 cubic feet per minute per linear foot as measured along the upper edge of the surface.

24. The cooling apparatus of claim 21, wherein said cooling duct has a distal end and a proximal end, and wherein said cooling duct has a cross-sectional area that increases from said distal end to said proximal end.

25. The cooling apparatus of claim 20, wherein the surface is a window that includes a radiation incident on the window blocking layer adapted to block at least about 50 percent of total solar radiation from entering the enclosed space.

26. A cooling system for an enclosed compartment that has a hot interior surface which is hotter than air in the enclosed compartment such that heat transfer by conduction from the hot interior surface to air that contacts the hot interior surface forms a hot air boundary layer adjacent the hot interior surface and flows upwardly in a laminar flow path along said hot interior surface, said cooling system comprising:
  a duct having an inlet positioned in said laminar flow path adjacent said hot interior surface and an outlet positioned outside said enclosed compartment, wherein said laminar flow path has a width of less than about 0.5 inches and said inlet of said duct has a width that matches within about twenty percent the width of said boundary layer and said interior surface has an upper edge and said inlet is positioned adjacent said upper edge; and
  a fan positioned in said duct, said fan being operable in a mode that creates a decreased pressure in said duct relative to air in said laminar flow path to draw air of said laminar flow path into said inlet.

27. The cooling system of claim 26, wherein said interior surface has an upper edge and said inlet is positioned below said upper edge.

28. A method of minimizing green house-type heat gain in a passenger compartment of a vehicle that has a window partially enclosing said passenger compartment which is exposed to solar radiation, said method comprising:
  absorbing a portion of incident solar radiation in said window to prevent such portion of said incident solar radiation from being transmitted by the window into passenger compartment;
  positioning an inlet of a duct in said passenger compartment adjacent an upper edge of said window and extending the duct to an outlet outside the passenger compartment; and
  drawing into said inlet a laminar flow of hot air formed in a boundary layer adjacent the window by conduction of heat energy derived from solar radiation absorbed in the window to air in the passenger compartment that contacts the window; and
  conducting the hot air from the inlet through the duct to the outlet and exhausting the hot air outside the passenger compartment.

29. A method for reducing build up of heat within an interior of an enclosed space, the space defined by at least one surface having an elevated temperature relative to the interior of the enclosed space and having a boundary layer of heated gas with a width of less than about 0.5 inches adjacent said surface, said method comprising the steps of:
  providing a cooling duct adjacent at least one surface, said cooling duct including at least one gas inlet having a width substantially equal to said width of said boundary layer;
  providing at least one fan in fluid communication with said cooling duct;
  operating said fan to draw the boundary layer of heated gases into said gas inlet and through said cooling duct, said fan having a volumetric flow rate capacity that is selected to substantially capture the gases only in the boundary layer;
  providing at least one gas outlet downstream of said fan; and
  discharging the heated air through said gas outlet outside of the enclosed space.

30. The method of claim 29, wherein said flow rate of the gases drawn into said gas inlet is substantially uniform.

31. The method of claim 30, wherein said flow rate of the gases drawn into said gas inlet is determined based on the height of the surface.

32. The method of claim 29, wherein said cooling duct has a distal end and a proximal end and wherein the cross-sectional area of said cooling duct increases from said distal end to said proximal end.

33. The method of claim 32, further comprising the step of establishing a uniform flow rate of the gases drawn into said gas inlet by developing a uniform pressure drop in said cooling duct as said gases flow therethrough.

34. The method of claim 29, further comprising the step of positioning an air inlet vent on the enclosed space to enable ambient air exterior to the enclosed space to flow into the enclosed space at an inlet flow rate of about said volumetric flow rate capacity of said fan.

* * * * *